United States Patent [19]
Swensen et al.

[11] Patent Number: 5,730,445
[45] Date of Patent: Mar. 24, 1998

[54] PRESSURE ENERGIZED METALIC SEALING RING

[75] Inventors: Jeffrey E. Swensen, Eldersburg; Mark A. Higgins, Laurel, both of Md.

[73] Assignee: EG&G Pressure Science, Inc., Beltsville, Md.

[21] Appl. No.: 813,290

[22] Filed: Mar. 10, 1997

[51] Int. Cl.⁶ .................................................. F16J 15/08
[52] U.S. Cl. .......................... 277/207 A; 277/236; 285/917
[58] Field of Search .......................... 277/207 A, 236; 285/111, 363, 917

[56] References Cited

U.S. PATENT DOCUMENTS

| | | | |
|---|---|---|---|
| 3,192,690 | 7/1965 | Taylor | 220/46 |
| 3,272,521 | 9/1966 | McNenny | 277/205 |
| 3,520,544 | 7/1970 | Taylor | 277/206 |
| 3,797,836 | 3/1974 | Halling | 277/236 |
| 3,869,132 | 3/1975 | Taylor et al. | 277/26 |
| 4,067,585 | 1/1978 | Rode | 277/200 |
| 4,121,843 | 10/1978 | Halling | 277/200 |
| 4,477,086 | 10/1984 | Feder et al. | 277/26 |
| 4,589,666 | 5/1986 | Halling | 277/200 |
| 4,602,888 | 7/1986 | Court et al. | 277/236 |
| 4,779,901 | 10/1988 | Halling | 285/184 |
| 4,832,353 | 5/1989 | Nicholson | 277/236 |
| 4,854,600 | 8/1989 | Halling et al. | 277/236 |
| 4,915,397 | 4/1990 | Nicholson | 277/236 |
| 5,240,263 | 8/1993 | Nicholson | 277/236 |
| 5,249,814 | 10/1993 | Halling | 277/206 R |
| 5,433,370 | 7/1995 | Halling | 228/155 |
| 5,630,593 | 5/1997 | Swensen et al. | 277/236 |

FOREIGN PATENT DOCUMENTS 0692660  1/1996  European Pat. Off.

OTHER PUBLICATIONS

Nicholson's Aircraft Seals Ltd, Catalog for Corruplus Gaskets, Issue VI; May 1985, three pages.

*Primary Examiner*—Scott Cummings
*Attorney, Agent, or Firm*—Roylance,Abrams,Berdo & Goodman, L.L.P.

[57] ABSTRACT

A sealing ring for sealing axially facing annular surfaces having an annular bight portion and annular first and second leg portions. The annular bight portion having a first end and a second end, with an arcuate concave surface and an arcuate convex surface. The annular first leg portion having a first curved section extending from the first end of the bight portion and a second curved section extending from the first curved section to a first free end, the first and second curved sections each having an arcuate concave surface and an arcuate convex surface. The convex surface of the second curved section forms a first annular sealing surface. An annular second leg portion having a third curved section extending from the second end of the bight portion and a fourth curved section extending from the end of the third curved section to a second free end. The third and fourth curved sections each having an arcuate concave surface and an arcuate convex surface. The convex surface of the fourth curved section forms a second annular sealing surface. The convex surface of the bight portion, the concave surfaces of the first and third curved sections, and the convex surfaces of the second and fourth curved sections form a contiguous outer surface of the sealing ring.

19 Claims, 4 Drawing Sheets

PRESSURE ENERGIZED METALIC SEALING RING

FIELD OF THE INVENTION

The present invention generally relates to a fluid-tight sealing ring for sealing axially facing annular surfaces. More specifically, the present invention relates to a pressure energized sealing ring with resilient portions for maintaining a sealing line between axially facing annular surfaces while accommodating out-of-flat surfaces on the annular surfaces.

BACKGROUND OF THE INVENTION

Typically, extremely compact, rigid, pneumatic duct joints are sealed by sealing lips that are made from sheet metal and formed integrally with the flanges of their respective duct sections. This type of duct joint is used in aircraft pneumatic duct systems, such as air bleeding systems.

Such prior art sealing lips have many disadvantages. For instance, sealing lips are relatively non-compliant. Additionally, since the sealing lips are formed on sheet metal flanges to effect the seal between duct sections, the clamping load applied to the duct sections is applied through the sealing lips. Therefore, when excessive clamping is employed to improve the seal between the ducts, the sealing lips can be permanently deformed. This permanent deformation can lead to leakage at the duct joint and, ultimately, the need for repair by roll forming the lips which generally fails to recreate the original sealing ability of the duct sections and often replacement of the duct joint. However, replacing sealing lips requires removing the flange from the duct and welding a new flange in its place. This replacement process is relatively difficult and expensive.

Resilient, metallic sealing rings are currently utilized in a wide variety of applications. However, current metallic sealing rings are not adequate for extremely compact, rigid, pneumatic duct joints such as in aircraft pneumatic duct systems. Current sealing rings are generally too large to be used as a micro-seal in such a compact application. Further, current sealing rings do not have the required resiliency and durability to maintain a seal between flanges that commonly have out-of-flat surfaces from weld-induced stresses or handling damages, which is accentuated by the use of lightweight flanges.

Examples of prior art sealing rings are disclosed in the following U.S. Pat. No.: 5,433,370 to Halling; U.S. Pat. No. 4,854,600 to Halling et al.; U.S. Pat. No. 4,779,901 to Halling; U.S. Pat. No. 4,589,666 to Halling; U.S. Pat. No. 4,477,086 to Feder et al.; U.S. Pat. No. 4,121,843 to Halling; U.S. Pat. No. 4,067,585 to Rode; U.S. Pat. No. 3,869,132 to Taylor et al; U.S. Pat. No. 3,520,544 to Taylor; U.S. Pat. No. 3,272,521 to McNenny; and U.S. Pat. No. 3,192,690 to Taylor.

In view of the above, it is apparent that there exists a need for a sealing ring which is extremely compact while being sufficiently resilient and durable to maintain a seal between flanges with out-of-flat surfaces. This invention addresses these needs in the art, along with other needs, which will become apparent to those skilled in the art once given this disclosure.

SUMMARY OF THE INVENTION

Accordingly, an object of the present invention is to provide a sealing ring for sealing axially facing annular surfaces.

Another object of the present invention is to provide a sealing ring that is extremely compact and resilient.

A further object of the invention is to provide a sealing ring that can provide a seal between out-of-flat surfaces on the opposing faces of the two members to be sealed together.

Still another object of the invention is to provide a sealing ring that is relatively inexpensive, light-weight, and easily replaceable.

The foregoing objects are basically attained by providing a sealing ring for sealing axially facing annular surfaces, the sealing ring comprising an annular bight portion having a first end and a second end, with an arcuate concave surface and an arcuate convex surface both extending between the first end and the second end; an annular first leg portion having a first curved section extending from the first end of the bight portion and a second curved section extending from the first curved section to a first free end, the first curved section having an arcuate concave surface and an arcuate convex surface both extending between the first end of the bight portion and the second curved section, the second curved section having an arcuate concave surface and an arcuate convex surface both extending between the first curved section and the first free end, the convex surface of the second curved section forming a first annular sealing surface; and an annular second leg portion having a third curved section extending from the second end of the bight portion and a fourth curved section extending from the end of the third curved section to a second free end, the third curved section having an arcuate concave surface and an arcuate convex surface both extending between the second end of the bight portion and the fourth curved section, the fourth curved section having an arcuate concave surface and an arcuate convex surface both extending between the third curved section and the second free end, the convex surface of the fourth curved section forming a second annular sealing surface, the convex surface of the bight portion, the concave surfaces of the first and third curved sections, and the convex surfaces of the second and fourth curved sections forming a contiguous outer surface of the sealing ring.

Other objects, advantages and salient features of the invention will become apparent from the following detailed description which, taken in conjunction with the annexed drawings, discloses a preferred embodiment of the invention.

BRIEF DESCRIPTION OF THE DRAWINGS

Referring now to the attached drawings which form a part of this original disclosure.

DETAILED DESCRIPTION OF THE INVENTION

Figure 1:
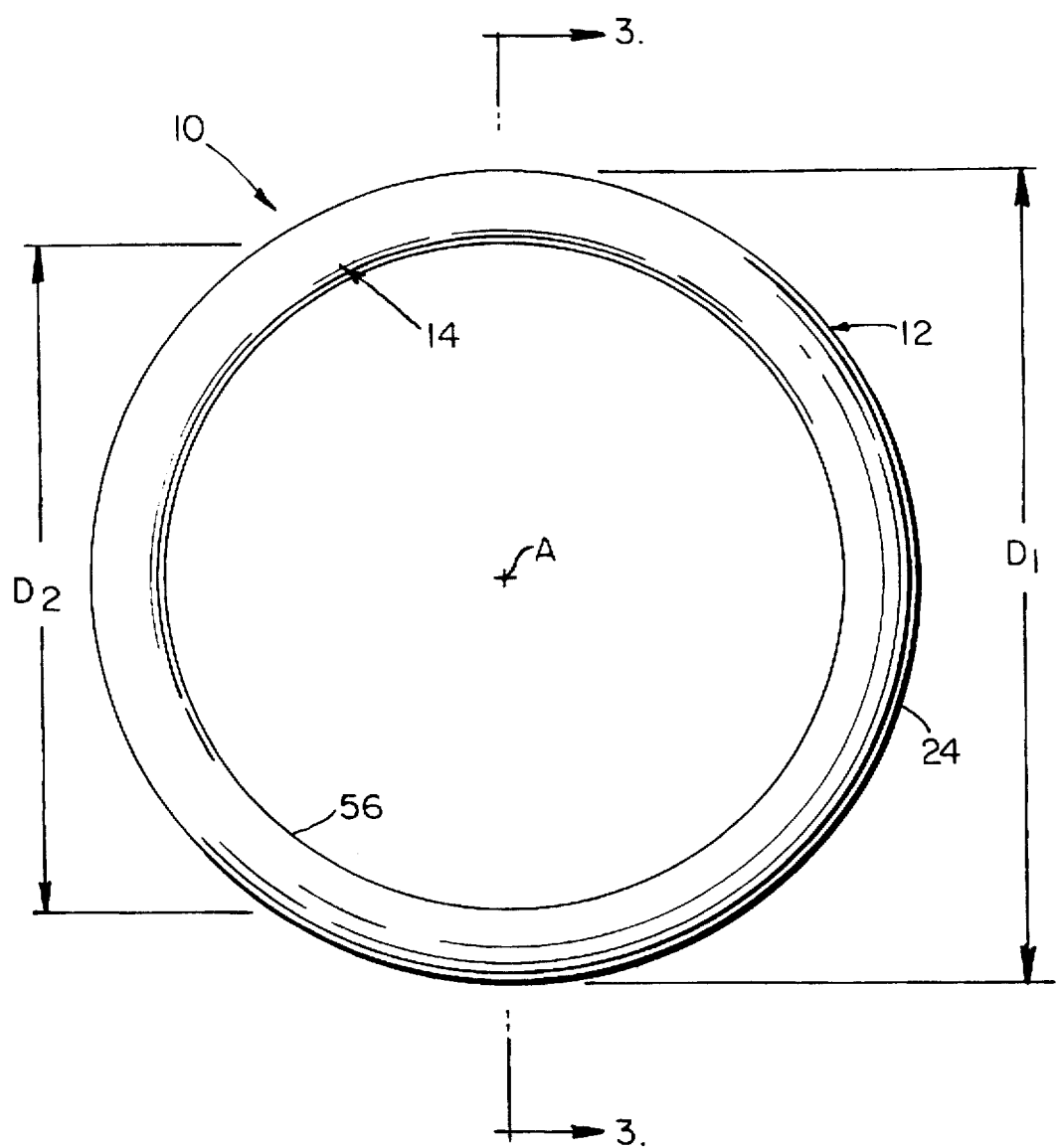
FIG. 1 is a side elevational view of a pressure-energized sealing ring in accordance with the present invention.
Figure 2:
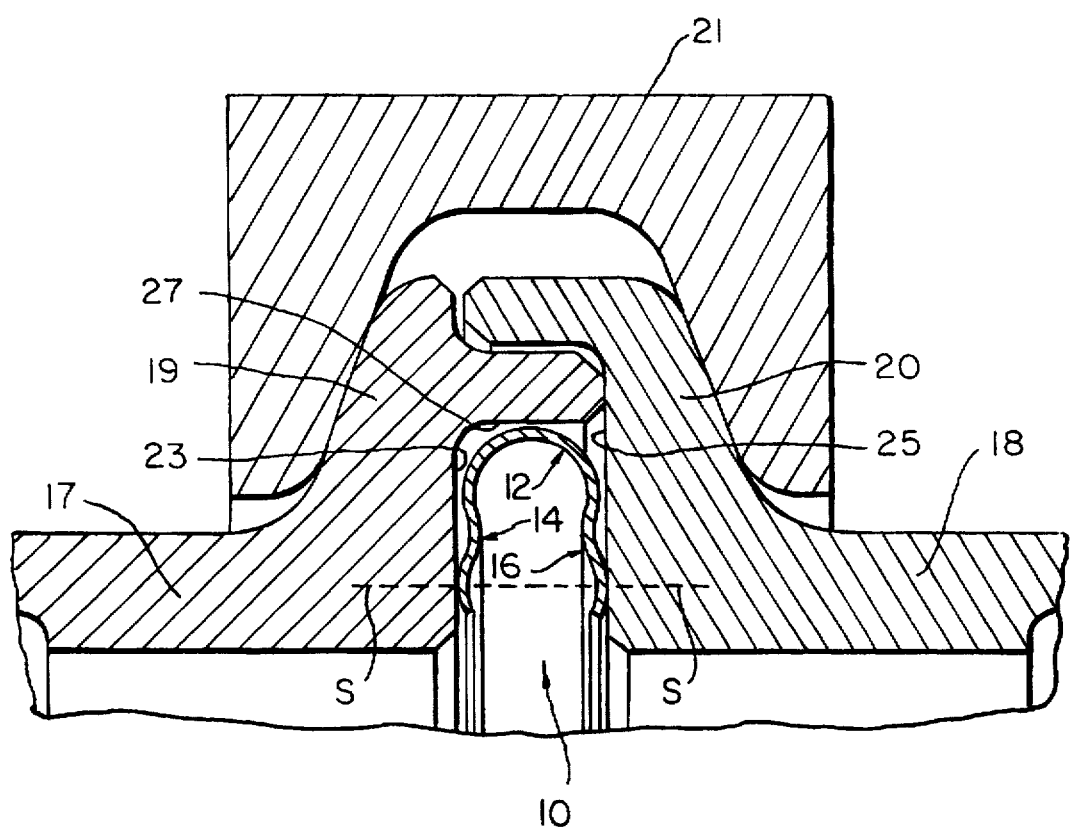
FIG. 2 is an enlarged partial, longitudinal cross-sectional view of the sealing ring illustrated in FIG. 1 in accordance with the present invention and installed in a joint between a pair of pipes that are coupled together by a clamping device.

Referring initially to FIGS. 1 and 2, an internally pressure-energized sealing ring 10 in accordance with the present invention is illustrated. Sealing ring 10 includes an annular bight portion 12, a first annular leg portion 14 extending from one end of bight portion 12, and a second annular leg portion 16 extending from the other end of bight portion 12. Bight portion 12 and leg portions 14 and 16 are all concentric about center longitudinal axis A of sealing ring 10. Preferably, a transverse center plane B bisects sealing ring 10 in half such that the right and left halves are mirror images of each other. Also, center plane B passes through center axis A.

Sealing ring 10 is constructed of a singular ply of resilient, metallic material. The ply has a relatively constant thickness along its entire length of approximately 0.006–0.008 inch. The metallic material can be any high temperature resilient material such as INCONEL 718, any other high temperature stainless steel, or any newly developed high temperature, resilient material. In the preferred embodiment, sealing ring 10 is a micro-seal having an outer diameter $D_1$ and an inner diameter $D_2$, with $D_1$ being in the range of approximately 0.95 inches to approximately 4.20 inches and $D_2$ being in the range of approximately 0.75 inches to approximately 4.01 inches. Of course, the sealing ring in accordance with the present invention can be constructed with larger diameters for use in other applications.

Figure 4:
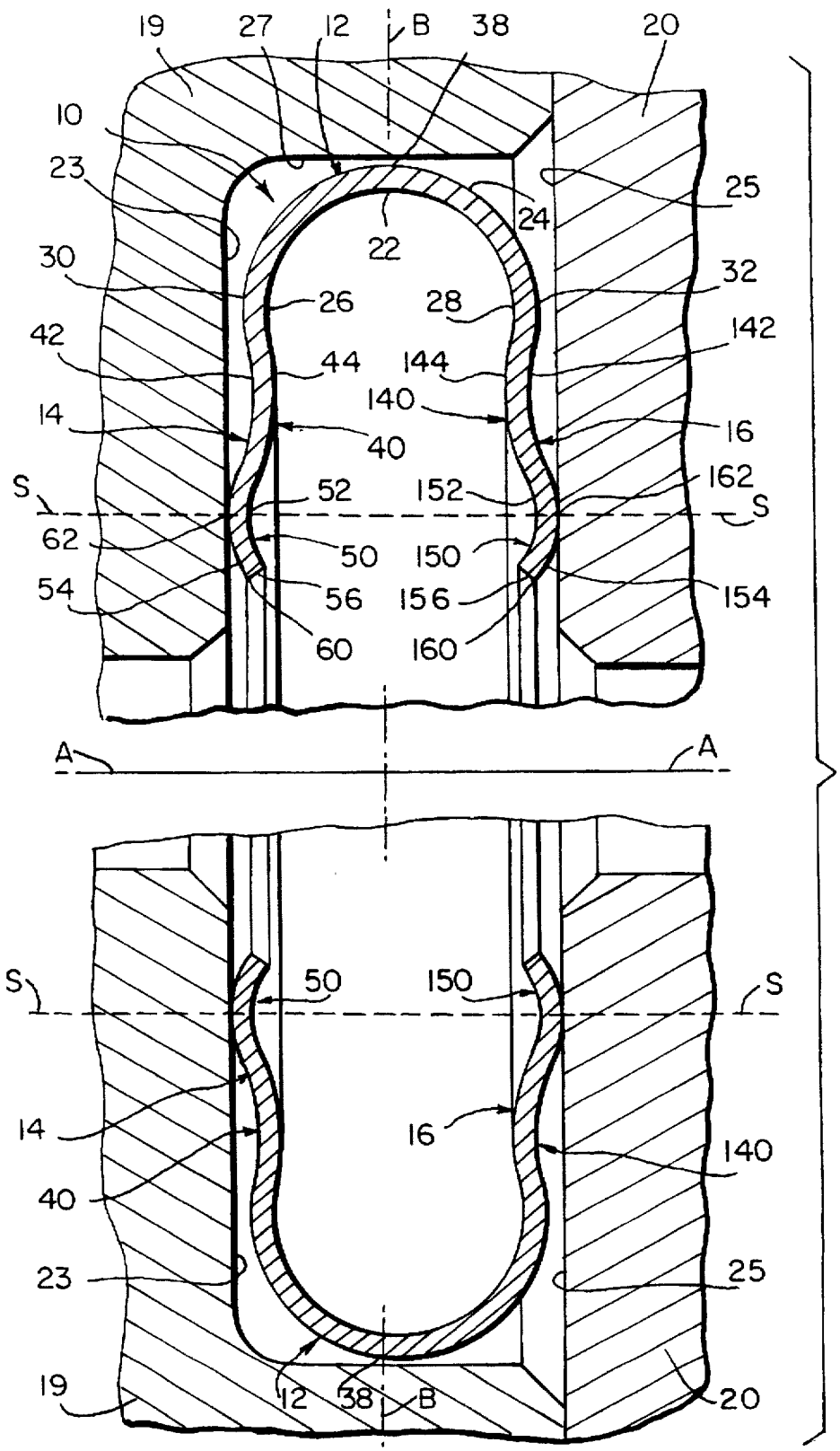
FIG. 4 is an enlarged partial, longitudinal cross-sectional view of the sealing ring illustrated in FIGS. 1–3 in accordance with the present invention, but showing the sealing ring of the present invention installed in a joint between a pair of pipes.

Sealing ring 10 is typically located between two coaxial pipes 17 and 18 to seal the interface therebetween. Pipes 17 and 18 have peripheral flanges 19 and 20, respectively, that are commonly secured together by a conventional clamping device 21. Sealing ring 10 forms a sealing line S when in longitudinal cross-section where sealing ring 10 contacts flange surface 23 of range 19 and flange surface 25 of range 20 as seen in FIGS. 2 and 4, as discussed below. In other words, sealing ring 10 forms a first annular seal where its first annular leg portion 14 engages flange surface 23 of flange 19, and a second annular seal where its second annular leg portion 16 engages flange surface 25 of range 20. Sealing line S is a line which extends between the first and second annular seals. In the preferred embodiment, sealing line S is substantially parallel to axis A of sealing ring 10.

Figure 3:
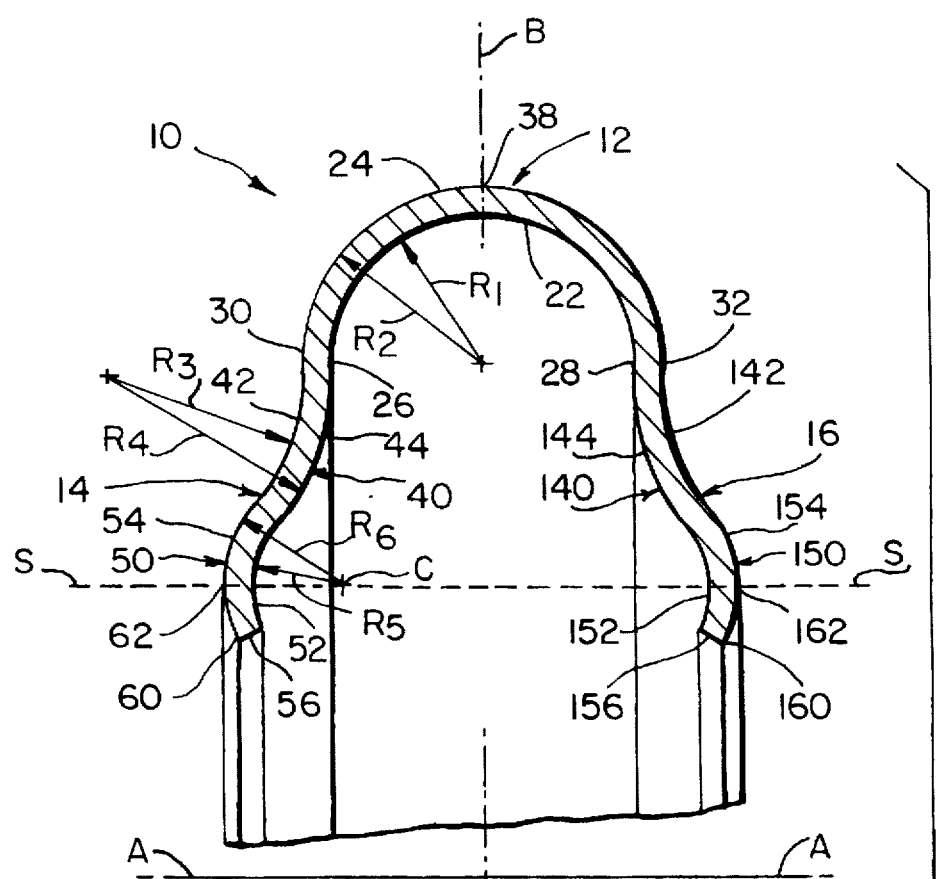
FIG. 3 is an enlarged partial, longitudinal cross-sectional view of the sealing ring illustrated in FIGS. 1 and 2 taken along section line 3—3 of FIG. 1.
Figure 3:
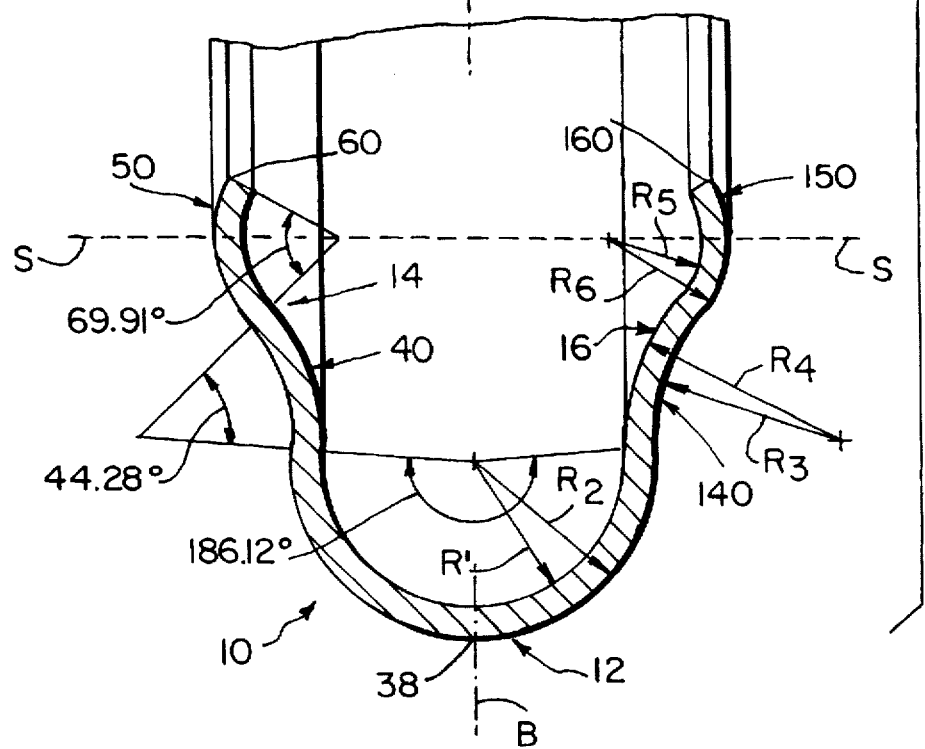

As seen in FIG. 3, bight portion 12 in its unstressed state is substantially semicircular in shape when viewed in longitudinal cross-section. Bight portion 12 extends through an arc in the range of approximately 180° to 190° when in its unstressed state. Preferably, bight portion 12 extends through an arc of approximately 185° when in its unstressed state. As seen in FIG. 3, bight portion 12 extends through an arc of approximately 186.12°. Bight portion 12 has an internal concave surface 22 and an external convex surface 24, both extending between a first end 26 of bight portion 12 to a second end 28 of bight portion 12. Each surface 22 and 24 forms a relatively smooth arc substantially in the form of a semi-circle or a portion of a circle. Since bight portion 12 is a relatively smooth arc, there is no single bending point with high localized stresses as in a V-type sealing ring or in the tight radius bands of some prior seals.

Also, bight portion 12 has a substantially constant thickness of approximately 0.006–0.008 inch along its entire length extending between first end 26 and second end 28. Concave surface 22 preferably has a radius $R_1$ of 0.032–0.034 inch and convex surface 24 preferably has a radius $R_2$ of approximately 0.038–0.040 inch.

A first apex point 30 is located on convex surface 24 of bight portion 12 adjacent first leg portion 14 a second apex point 32 is located on convex surface 24 of bight portion 12 adjacent second leg portion 16. Apex points 30 and 32 are the points of bight portion 12 that are furthest from the center plane B of sealing ring 10. Since bight portion 12 is symmetric about center plane B, apex point 32 is directly opposite apex point 30 and is the only other point on bight portion 12 that is as far from center plane B as apex point 30. The distance between apex point 30 and apex point 32 is preferably substantially equal to the diameter of the arc which forms bight portion 12. This distance is approximately in the range of 0.074–0.060 inch and is ideally twice the radius $R_2$.

When sealing ring 10 is in its uninstalled (unstressed) configuration as seen in FIG. 3, first and second apex points 30 and 32 are preferably located at first and second ends 26 and 28, respectively. Bight portion 12 also has an apex point or outermost point 38 in longitudinal cross-section with respect to axis A of sealing ring 10. Outermost point 38 is located on convex surface 24 and is the furthest point on bight portion 12 from center axis A of sealing ring 10.

Bight portion 12 is designed to be as large as possible without engaging opposed flange surfaces 23 and 25 of pipe flanges 19 and 20 when installed therebetween as seen in FIG. 4. Accordingly, bight portion 12 is free to deflect inwardly during installation between flange 19 and 20 to avoid any localized stress occur therein. In other words, the stress in bight portion 12 is more uniformly distributed since bight portion 12 does not contact pipe flanges 19 or 20. Additionally, since bight radius $R_2$ is as large as possible without contacting surfaces 23 and 25 of flanges 19 and 20, bending stresses are minimized. Of course, the radius of bight portion 12 is also limited in size by the radial height of the cavity formed between flanges 19 and 20. The radius of bight portion 12 is also limited in size by the minimum clearance required between flange surfaces 23 and 25 and sealing ring 10.

Through analysis, it has been discovered that the larger the axial length or arc of bight portion 12, the lower the mount of stress and the lower the amount of penetration or stress saturation through the longitudinal cross-section of sealing ring 10. The optimal distance between apex portion 62 and apex portion 162 has been found to be about 0.098 inch, while the optimal cross-section thickness has been found to be about 0.006 for INCONEL 718.

However, sealing ring 10 can be formed to contact inner cylindrical surface 27 of flange 19 at two outermost points 38 of bight portion 12. In particular, sealing ring 10 can be made intentionally out-of-round to hold the sealing ring 10 in position within pipe flange 19 for inverted installation of sealing ring 10. Such out-of-round practice is common in the art and does not adversely affect the stresses of sealing ring 10 or the fact that bight portion 10 is substantially out-of-contact with pipe flanges 19 and 20.

As seen in FIG. 3, leg portions 14 and 16 are substantially identical, except that leg portion 16 is a mirror image of leg portion 14. Accordingly, only leg portion 14 will be described in detail. Moreover, it will be apparent to those skilled in the art from this disclosure that the description of leg portion 14 also applies to leg portion 16. Leg portion 14 includes a first curved section 40 and a second curved section 50. First curved section 40 extends between end 26 of bight portion 12 and the beginning of second curved section 50 and has an external arcuate concave surface 42 and an internal arcuate convex surface 44. Both concave surface 42 and convex surface 44 extend the entire length of first curved section 40 between end 26 of bight portion 12 and the beginning of second curved section 50.

Also, both concave surface 42 and convex surface 44 form an arc of a respective circle. Concave surface 42 forms an arc of a circle having a radius $R_3$ of approximately 0.040–0.042 inch, while convex surface 44 forms an arc of a circle having a radius $R_4$ of approximately 0.046–0.048 inch. Both concave surface 42 and convex surface 44 diverge from plane B as surfaces 42 and 44 continue from bight portion 12 to second curved section 50. The length of first curved section 40 from bight portion 12 to second curved portion 50 corresponds to an arc of approximately 40° to 50° in its unstressed state. Preferably, first curved section 40 extends through an arc of approximately 45°. For example, first curved section 40 is approximately 44.28° as seen in FIG. 3. First curved section 40 has a constant thickness along its entire length. The thickness of first curved section 40 is identical to the thickness of bight portion 12 and is approximately 0.006–0.008 inch.

Analysis was performed to determine the optimal radius of first curved section 40. The analysis showed that decreasing radius $R_3$, or the blend radius, decreased the maximum stress and the maximum stress observed migrated towards the blend radius $R_3$. However, at very tight or small blend radii $R_3$, manufacturability was brought into question since a sealing ring 10 with a small blend radius $R_3$ is more difficult and expensive to manufacture. Additional analysis in developing sealing ring 10 proved that as blend radius $R_3$ was increased, the maximum stress through the longitudinal cross-section of sealing ring 10 increased and was localized around the pivot point of the cross-section approximately, around the portion of curved section 50 that is closest to center plane B. Therefore, a blend radius $R_3$ was selected such that the stresses through the longitudinal cross-section of sealing ring 10 were minimized while still maintaining manufacturability.

Second curved section 50 has a concave surface 52 and a convex surface 54 and extends from first curved section 40 to a first free end 56. Both concave surface 52 and convex surface 54 are arcs of circles and extend along the entire length of second curved section 50. Concave surface 52 is an arc of a circle having a radius $R_5$ of approximately 0.029–0.03 1 inch. Convex surface 54 is an arc of a circle having a radius $R_6$ of approximately 0.035–0.037 inch. Second curved section 50 also has a constant thickness along its entire length. This thickness being identical to the thickness of bight portion 12 and first curved section 40, that is, a thickness of approximately 0.006–0.008 inch. The length of second curved section 50 from first curved section 40 to first free end 56 corresponds to an arc of approximately 65° to 75° in its unstressed state. Preferably, second curved section 50 extends through an arc of approximately 70°. In the example illustrated in FIG. 3, second curved section 50 extends through an arc of approximately 69.91°. First free end 56 is positioned such that the distance between the center point C from which radii $R_5$ and $R_6$ extend and the point 60 on convex surface 54 closest to sealing ring axis A is approximately 0.020 inch as measured along a line that is substantially perpendicular to sealing ring axis A. Point 60 is the inwardmost point 60 on convex surface 54 at first free end 56.

Second curved section 50 further has an apex point 62 that is the point on convex surface 54 that is furthest from center plane B. Apex point 62 forms one of the two points through which sealing line S passes in longitudinal cross-section of sealing ring 10 as discussed below. Innermost point of free end 56 is at least a distance of approximately 0.003 inch from apex point 62 as measured along a line extending parallel to sealing ring axis A. Additionally, the distance between innermost point 64 on first free end 56 and the outwardmost point 38 of sealing ring 10 on bight portion 12 is approximately 0.089–0.104 inch taken along a line perpendicular to sealing ring axis A. The lengths of legs 14 and 16 of sealing ring 10 are maximized to accommodate the maximum amount of bending.

Second leg portion 16 extends from the second end 28 of bight portion 12 and has a first curved section 140 and a second curved section 150. First curved section 140 has a concave surface 142 and a convex surface 144. Second curved section 150 has a concave surface 152, a convex surface 154, a free end 156, an apex point 162, and an inwardmost point 164. Second leg portion 16 joins with bight portion 12 and first leg portion 14 to produce a smooth contiguous sealing ring outer surface formed by convex surface 54, concave surface 42, convex surface 24, concave surface 142 and convex surface 154.

Accordingly, the profile of sealing ring 10 is basically a smooth curved member constructed of five arcs from five circles. The first circle has an arc forming bight portion 12 with inner surface radius $R_1$ and outer surface radius $R_2$. The second and third circles have arcs forming first curved sections 42 and 142 with an outer surface radius $R_3$ and an inner surface radius $R_4$. Finally, the fourth and fifth circles have arcs forming second curved sections 50 and 150 with an inner surface radius $R_5$ and an outer surface radius $R_6$. The outer surface of sealing ring 10 is a smooth curved surface with the five arcs with radii $R_2$, $R_3$ and $R_6$ connected together, while the inner surface of sealing ring 10 is a smooth curved surface with five arcs with radii $R_1$, $R_2$ and $R_5$ connected together. Both the outer and inner surfaces of sealing ring 10 are free of any flat sections or abrupt changes in curvature. In other words, the curvature of bight portion 12 is blended into the curvatures of first curved sections 42 and 142 and the curvatures of second curved sections 50 and 152 are blended into the curvatures of first curved sections 42 and 142, respectively. Thus, the intersections of bight portion 12 with first curved sections 42 and 142 can have curvatures which do not form part of one of the five circles which form the profile of sealing ring 10. Likewise, the intersections of first curved sections 42 and 142 with second curved sections 52 and 152 can have curvatures which do not form part of one of the five circles which form the profile of sealing ring 10.

As seen in FIG. 4 and stated above, when sealing ring 10 is installed between pipe flanges 19 and 20, sealing ring 10 contacts pipe flanges 19 and 20 at flange surfaces 23 and 25. Further, sealing ring 10 contacts flange surfaces 23 and 25 only at apex points 62 and 162 of convex surfaces 54 and 154, respectively. Therefore, the distance between apex points 62 and 162 of first and second leg portions 14 and 16 is larger than the distance between apex point 30 and 32 of bight portion 12. The line extending in longitudinal cross-section from apex point 62 to apex point 162 is the sealing line S. Sealing line S represents the line beyond which fluid within pipes 17 and 19 does not pass.

Sealing ring 10 was designed to operate elastically when installed, at maximum operating temperature, and at zero pressure, typical of a "soak-back" situation. Therefore, when the seal is installed and pressurized, the stresses are lower than when the seal is only installed without fluid pressure being applied. Also, since sealing ring 10 operates in the elastic range, leg portions 14 and 16 are better suited to move laterally along sealing line S to maintain contact with out-of-flat areas on flange surfaces 23 and 25. Thus, leg portions 14 and 16 must be of sufficient elasticity to spring back and maintain sealing line S through both axial directions along sealing line S. Such out-of-flat areas often occurring due to weld induced stresses or handling.

Accordingly, the material, thickness, length and curvature of sealing ring 10 are all selected to allow such resilient deflection of legs 14 and 16.

It should be understood, that sealing ring 10 will vary in dimensions and size according to the specific sealing envelopes in which the seal will be installed and for the various internal or external pressure configurations to which the sealing ring 10 will be exposed. Therefore, the various radii of sealing ring 10, the materials, and the thickness can all vary depending upon the characteristics of the environment in which the sealing ring 10 will be used. Additionally, it should be understood that sealing ring 10 may be used in applications other than in compact, rigid duct joints, especially where a relatively large deflection capability is desired for a pressure-energized metallic seal. Additionally, although sealing ring 10 is described as being made from a single ply, multiple plies may be employed for some purpose other than containing higher pressures.

While advantageous embodiments have been chosen to illustrate the invention, it will be understood by those skilled in the art that various changes and modifications can be made therein without departing from the scope of the invention as defined in the appended claims.

What is claimed is:

1. A pressure-energized, metallic sealing ring for sealing axially facing annular surfaces, comprising:

an annular bight portion having a first end and a second end, with an arcuate concave surface and an arcuate convex surface both extending between said first end and said second end, and said bight portion having a main apex between said first end and said second end;

an annular first leg portion having a first curved section extending from said first end of said bight portion and a second curved section extending from said first curved section to a first free end, said first curved section having an external arcuate concave surface and an internal arcuate convex surface both extending between said first end of said bight portion and said second curved section, said second curved section having an internal arcuate concave surface and an external arcuate convex surface both extending between said first carved section and said first free end, said external convex surface of said second curved section forming an axially facing first annular sealing surface; and an annular second leg portion having a third curved section extending from said second end of said bight portion and a fourth curved section extending from said end of said third curved section to a second free end, said third curved section having an arcuate concave surface and an arcuate convex surface both extending between said second end of said bight portion and said fourth curved section, said fourth curved section having an arcuate concave surface and an arcuate convex surface both extending between said third curved section and said second free end, said convex surface of said fourth curved section forming an axially facing second annular sealing surface, said convex surface of said bight portion, said concave surfaces of said first and third curved sections, and said convex surfaces of said second and fourth curved sections forming a contiguous outer surface of said sealing ring.

2. A sealing ring according to claim 1, wherein said bight portion and said first and second leg portions are concentric about an axis.

3. A sealing ring according to claim 2, wherein: said sealing ring is symmetric with respect to a center plane extending normal to said axis and bisecting said bight portion.

4. A sealing ring according to claim 3, further comprising:
a first point located on said sealing ring between said main apex of said bight portion and said fourth curved section, said first point being furthest from said center plane in the region between said main apex of said bight portion and said fourth curved section, and
said convex surface of said fourth curved section has a second apex point that is a point of said fourth curved section that is furthest from said center plane, and wherein said second apex point is spaced further from said center plane than said first point.

5. A sealing ring according to claim 4, wherein said first and second leg portions are sufficiently resilient such that said fourth and fifth curved sections move towards each other upon the application of a sealing force to at least one of said fourth and fifth curved sections.

6. A sealing ring according to claim 1, wherein said bight portion and said first and second leg portions are integrally formed as a one-piece, unitary member.

7. A sealing ring according to claim 6, wherein said one-piece, unitary member has a constant thickness along its entire length.

8. A sealing ring according to claim 7, wherein said bight portion and said first and second leg portions are constructed from a resilient, metallic material.

9. A sealing ring according to claim 1, wherein said convex surface of said bight portion forms an arc of a first circle having a first radius, said concave surface of said first curved section forms an arc of a second circle having a second radius, said concave surface of said second curved section forms an arc of a third circle having a third radius, said convex surface of said third curved section form an arc of a fourth circle having a fourth radius, and said convex surface of said fourth curved section forms an arc of a fifth circle having a fifth radius.

10. A sealing ring according to claim 9, wherein said first radius is less than said second and fourth radii, and said first radius is greater than said third and fifth radii.

11. A sealing ring according to claim 10, wherein said second and fourth radii are of equal length, and said third and fifth radii are of equal length.

12. A sealing ring according to claim 11, wherein said first radius is approximately 109 percent greater than said third and fifth radii, and said second and fourth radii are approximately 114 percent greater than said third and fifth radii.

13. A sealing ring according to claim 12, wherein said arc of said first circle extends in a range of approximately 180° to approximately 190° along its circumference.

14. A sealing ring according to claim 13, wherein said said arc of said second circle and said arc of said fourth circle extend in a range of approximately 40° to approximately 50° along their respective circumferences.

15. A sealing ring according to claim 14, wherein said said arc of said third circle and said arc of said fifth circle extend in a range of approximately 65° to approximately 75° along their respective circumferences.

16. A sealing ring according to claim 15, wherein said second and fourth curved sections diverge from each other as they extend away from said ends of said first and third curved sections, respectively, and converge towards each other as said second and fourth curved sections further extend toward said first and second free ends, respectively.

17. A sealing ring according to claim 16, wherein said bight portion and said first and second leg portions are integrally formed as a one-piece, unitary member.

18. A sealing ring according to claim 17, wherein said one-piece, unitary member has a constant thickness along its entire length.

19. A sealing ring according to claim 18, wherein said bight portion and said first and second leg portions are constructed from a resilient, metallic material.

* * * * *